US008892223B2

(12) United States Patent
Leen et al.

(10) Patent No.: US 8,892,223 B2
(45) Date of Patent: Nov. 18, 2014

(54) HVAC CONTROLLER INCLUDING USER INTERACTION LOG

(75) Inventors: Cary Leen, Hammond, WI (US); Stan Zywicki, Eden Prairie, MN (US); Eric Barton, Eden Prairie, MN (US); David Schultz, Savage, MN (US); Mohammad Aljabari, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 364 days.

(21) Appl. No.: 13/227,395

(22) Filed: Sep. 7, 2011

(65) Prior Publication Data

US 2013/0060385 A1    Mar. 7, 2013

(51) Int. Cl.
  *G05D 23/00*  (2006.01)
  *G01R 31/36*  (2006.01)
  *F24F 11/00*  (2006.01)

(52) U.S. Cl.
  CPC ..... *F24F 11/0009* (2013.01); *F24F 2011/0057* (2013.01); *F24F 2011/0093* (2013.01); *F24F 2011/0091* (2013.01); *F24F 2011/0061* (2013.01); *F24F 2011/0063* (2013.01); *F24F 11/0086* (2013.01)
  USPC .................. 700/83; 700/17; 700/18; 700/276

(58) Field of Classification Search
  USPC ........................................ 700/17, 18, 83, 276
  See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong | |
| 4,298,946 A | 11/1981 | Hartsell et al. | |
| 4,308,991 A | 1/1982 | Peinetti et al. | |
| 4,316,256 A * | 2/1982 | Hendricks et al. | 700/278 |
| 4,332,352 A | 6/1982 | Jaeger | |
| 4,337,822 A | 7/1982 | Hyltin et al. | |
| 4,337,893 A | 7/1982 | Flanders et al. | |
| 4,373,664 A | 2/1983 | Barker et al. | |

(Continued)

FOREIGN PATENT DOCUMENTS

| | | |
|---|---|---|
| DE | 3334117 | 4/1985 |
| EP | 0070414 | 1/1983 |

(Continued)

OTHER PUBLICATIONS

"RCS X10 Thermostat Plug-in for HomeSeer Beta Version 2.0.105," 25 pages, prior to Sep. 7, 2011.

(Continued)

*Primary Examiner* — Ronald Hartman, Jr.
(74) *Attorney, Agent, or Firm* — Seager Tufte & Wickhem LLC

(57) ABSTRACT

An HVAC controller is configured to log one more user interactions into a user interaction log stored in its memory such that at least some of the user interactions may be recalled from the user interaction log and displayed on the user interface of the HVAC controller in response to a request by a user. The user may use the information contained in the user interaction log as an aid in troubleshooting an HVAC system.

21 Claims, 19 Drawing Sheets

(56) References Cited

U.S. PATENT DOCUMENTS

| | | |
|---|---|---|
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,036,698 A | 8/1991 | Conti |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,329,991 A | 7/1994 | Mehta et al. |
| 5,348,078 A | 9/1994 | Dushane et al. |
| 5,351,035 A | 9/1994 | Chrisco |
| 5,386,577 A | 1/1995 | Zenda |
| 5,390,206 A | 2/1995 | Rein et al. |
| 5,404,934 A | 4/1995 | Carlson et al. |
| 5,414,618 A | 5/1995 | Mock et al. |
| 5,429,649 A | 7/1995 | Robin |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitcuhashi |
| 5,544,036 A | 8/1996 | Brown, Jr. et al. |
| 5,566,879 A | 10/1996 | Longtin |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,732,691 A | 3/1998 | Maiello et al. |
| 5,761,083 A | 6/1998 | Brown, Jr. et al. |
| 5,782,296 A | 7/1998 | Mehta |
| 5,810,908 A | 9/1998 | Gray et al. |
| 5,818,428 A | 10/1998 | Eisenbrandt et al. |
| 5,833,134 A | 11/1998 | Ho et al. |
| 5,839,654 A | 11/1998 | Weber |
| 5,840,094 A | 11/1998 | Osendorf et al. |
| 5,862,737 A | 1/1999 | Chin et al. |
| 5,873,519 A | 2/1999 | Beilfuss |
| 5,886,697 A | 3/1999 | Naughton et al. |
| 5,902,183 A | 5/1999 | D'Souza |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,917,416 A | 6/1999 | Read |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 6,009,355 A | 12/1999 | Obradovich et al. |
| 6,013,121 A | 1/2000 | Chin et al. |
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,081,197 A | 6/2000 | Garrick et al. |
| 6,084,523 A | 7/2000 | Gelnovatch et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,145,751 A | 11/2000 | Ahmed et al. |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |
| 6,587,739 B1 * | 7/2003 | Abrams et al. ............... 700/83 |
| 6,595,430 B1 | 7/2003 | Shah |
| 6,596,059 B1 | 7/2003 | Greist et al. |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |

(56) References Cited

U.S. PATENT DOCUMENTS

| | | | |
|---|---|---|---|
| 6,663,010 B2 | 12/2003 | Chene et al. | |
| 6,685,098 B2 | 2/2004 | Okano et al. | |
| 6,726,112 B1 | 4/2004 | Ho | |
| D492,282 S | 6/2004 | Lachello et al. | |
| 6,783,079 B2 | 8/2004 | Carey et al. | |
| 6,786,421 B2 | 9/2004 | Rosen | |
| 6,789,739 B2 | 9/2004 | Rosen | |
| 6,801,849 B2 | 10/2004 | Szukala et al. | |
| 6,810,307 B1 | 10/2004 | Addy | |
| 6,810,397 B1 | 10/2004 | Qian et al. | |
| 6,824,069 B2 | 11/2004 | Rosen | |
| 6,833,990 B2 | 12/2004 | LaCroix et al. | |
| 6,842,721 B2 | 1/2005 | Kim et al. | |
| 6,851,621 B1 * | 2/2005 | Wacker et al. | 236/51 |
| 6,868,293 B1 | 3/2005 | Schurr et al. | |
| D512,208 S | 12/2005 | Kubo et al. | |
| 6,973,410 B2 | 12/2005 | Seigel | |
| 7,001,495 B2 | 2/2006 | Essalik et al. | |
| D520,989 S | 5/2006 | Miller | |
| 7,050,026 B1 | 5/2006 | Rosen | |
| 7,055,759 B2 | 6/2006 | Wacker et al. | |
| 7,080,358 B2 | 7/2006 | Kuzmin | |
| 7,083,109 B2 | 8/2006 | Pouchak | |
| 7,083,189 B2 | 8/2006 | Ogata | |
| 7,084,774 B2 | 8/2006 | Martinez | |
| 7,089,088 B2 | 8/2006 | Terry et al. | |
| 7,108,194 B1 | 9/2006 | Hankins, II | |
| 7,130,720 B2 | 10/2006 | Fisher | |
| D531,588 S | 11/2006 | Peh | |
| D533,515 S | 12/2006 | Klein et al. | |
| 7,146,253 B2 * | 12/2006 | Hoog et al. | 700/276 |
| 7,152,806 B1 | 12/2006 | Rosen | |
| 7,156,318 B1 | 1/2007 | Rosen | |
| 7,163,156 B2 | 1/2007 | Kates | |
| 7,188,002 B2 | 3/2007 | Chapman, Jr. et al. | |
| D542,236 S | 5/2007 | Klein et al. | |
| 7,212,887 B2 | 5/2007 | Shah et al. | |
| 7,222,800 B2 | 5/2007 | Wruck | |
| 7,225,054 B2 | 5/2007 | Amundson et al. | |
| 7,231,605 B1 | 6/2007 | Ramakesavan | |
| 7,232,075 B1 | 6/2007 | Rosen | |
| 7,240,289 B2 | 7/2007 | Naughton et al. | |
| 7,261,762 B2 | 8/2007 | Kang et al. | |
| 7,274,973 B2 | 9/2007 | Nichols et al. | |
| 7,302,642 B2 | 11/2007 | Smith et al. | |
| 7,331,187 B2 | 2/2008 | Kates | |
| 7,341,201 B2 | 3/2008 | Stanimirovic | |
| 7,354,005 B2 | 4/2008 | Carey et al. | |
| RE40,437 E | 7/2008 | Rosen | |
| 7,419,532 B2 | 9/2008 | Sellers et al. | |
| 7,435,278 B2 | 10/2008 | Terlson | |
| 7,451,606 B2 | 11/2008 | Harrod | |
| 7,452,396 B2 | 11/2008 | Terlson et al. | |
| 7,496,627 B2 | 2/2009 | Moorer et al. | |
| 7,505,914 B2 | 3/2009 | McCall | |
| 7,542,867 B2 | 6/2009 | Steger et al. | |
| 7,556,207 B2 | 7/2009 | Mueller et al. | |
| 7,594,960 B2 | 9/2009 | Johansson | |
| 7,604,046 B2 | 10/2009 | Bergman et al. | |
| 7,617,691 B2 | 11/2009 | Street et al. | |
| 7,644,591 B2 | 1/2010 | Singh et al. | |
| 7,665,019 B2 | 2/2010 | Jaeger | |
| 7,676,282 B2 | 3/2010 | Bosley | |
| 7,707,189 B2 | 4/2010 | Haselden et al. | |
| 7,713,339 B2 | 5/2010 | Johansson | |
| 7,739,282 B1 | 6/2010 | Smith et al. | |
| 7,770,242 B2 | 8/2010 | Sell | |
| 7,793,056 B2 | 9/2010 | Boggs et al. | |
| 7,814,516 B2 | 10/2010 | Stecyk et al. | |
| 7,865,252 B2 | 1/2011 | Clayton | |
| 7,941,431 B2 | 5/2011 | Bluhm et al. | |
| 7,952,485 B2 | 5/2011 | Schechter et al. | |
| 7,956,719 B2 * | 6/2011 | Anderson et al. | 340/3.51 |
| 7,957,775 B2 | 6/2011 | Allen, Jr. et al. | |
| 7,984,220 B2 | 7/2011 | Gerard et al. | |
| 8,032,254 B2 | 10/2011 | Amundson et al. | |
| 8,087,593 B2 | 1/2012 | Leen | |
| 8,091,796 B2 | 1/2012 | Amundson et al. | |
| 8,167,216 B2 | 5/2012 | Schultz et al. | |
| 8,219,249 B2 * | 7/2012 | Harrod et al. | 700/276 |
| 8,239,066 B2 | 8/2012 | Jennings et al. | |
| 8,280,556 B2 | 10/2012 | Besore et al. | |
| 8,437,878 B2 * | 5/2013 | Grohman et al. | 700/276 |
| 8,613,792 B2 * | 12/2013 | Ragland et al. | 95/25 |
| 2001/0025349 A1 | 9/2001 | Sharood et al. | |
| 2001/0029585 A1 | 10/2001 | Simon et al. | |
| 2001/0042684 A1 | 11/2001 | Essalik et al. | |
| 2001/0052459 A1 | 12/2001 | Essalik et al. | |
| 2002/0005435 A1 | 1/2002 | Cottrell | |
| 2002/0011923 A1 | 1/2002 | Cunningham et al. | |
| 2002/0022991 A1 | 2/2002 | Sharood et al. | |
| 2002/0060701 A1 | 5/2002 | Naughton et al. | |
| 2002/0082746 A1 | 6/2002 | Schubring et al. | |
| 2002/0092779 A1 | 7/2002 | Essalik et al. | |
| 2002/0096572 A1 | 7/2002 | Chene et al. | |
| 2002/0138184 A1 | 9/2002 | Kipersztok et al. | |
| 2002/0171624 A1 | 11/2002 | Stecyk et al. | |
| 2002/0173929 A1 | 11/2002 | Seigel | |
| 2003/0000692 A1 | 1/2003 | Okano et al. | |
| 2003/0014179 A1 | 1/2003 | Szukala et al. | |
| 2003/0033156 A1 | 2/2003 | McCall | |
| 2003/0033230 A1 | 2/2003 | McCall | |
| 2003/0034897 A1 | 2/2003 | Shamoon et al. | |
| 2003/0034898 A1 | 2/2003 | Shamoon et al. | |
| 2003/0070544 A1 | 4/2003 | Mulvaney et al. | |
| 2003/0074489 A1 | 4/2003 | Steger et al. | |
| 2003/0103075 A1 | 6/2003 | Rosselot | |
| 2003/0121652 A1 | 7/2003 | Carey et al. | |
| 2003/0123224 A1 | 7/2003 | LaCroix et al. | |
| 2003/0136135 A1 | 7/2003 | Kim et al. | |
| 2003/0142121 A1 | 7/2003 | Rosen | |
| 2003/0150926 A1 | 8/2003 | Rosen | |
| 2003/0150927 A1 | 8/2003 | Rosen | |
| 2003/0177012 A1 | 9/2003 | Drennen | |
| 2004/0074978 A1 | 4/2004 | Rosen | |
| 2004/0133314 A1 | 7/2004 | Ehlers et al. | |
| 2004/0193324 A1 | 9/2004 | Hoog et al. | |
| 2004/0245352 A1 | 12/2004 | Smith | |
| 2004/0262410 A1 | 12/2004 | Hull | |
| 2005/0083168 A1 | 4/2005 | Breitenbach | |
| 2005/0270151 A1 | 12/2005 | Winick | |
| 2006/0032379 A1 | 2/2006 | Kates | |
| 2006/0071086 A1 | 4/2006 | Kates | |
| 2006/0168342 A1 | 7/2006 | Budde et al. | |
| 2006/0186213 A1 | 8/2006 | Carey et al. | |
| 2006/0196953 A1 | 9/2006 | Simon et al. | |
| 2006/0219799 A1 | 10/2006 | Schultz et al. | |
| 2006/0242654 A1 | 10/2006 | Van Dok et al. | |
| 2007/0013534 A1 | 1/2007 | DiMaggio | |
| 2007/0029397 A1 | 2/2007 | Mueller et al. | |
| 2007/0045429 A1 | 3/2007 | Chapman, Jr. et al. | |
| 2007/0114293 A1 | 5/2007 | Gugenheim | |
| 2007/0114295 A1 | 5/2007 | Jenkins | |
| 2007/0277061 A1 | 11/2007 | Ashe | |
| 2007/0278320 A1 | 12/2007 | Lunacek et al. | |
| 2007/0289731 A1 | 12/2007 | Deligiannis et al. | |
| 2008/0015740 A1 | 1/2008 | Osann, Jr. | |
| 2009/0140056 A1 | 6/2009 | Leen | |
| 2009/0140060 A1 | 6/2009 | Stoner et al. | |
| 2009/0140062 A1 | 6/2009 | Amundson et al. | |
| 2009/0143879 A1 | 6/2009 | Amundson et al. | |
| 2009/0143880 A1 | 6/2009 | Amundson et al. | |
| 2009/0143916 A1 | 6/2009 | Boll et al. | |
| 2009/0165644 A1 | 7/2009 | Campbell | |
| 2009/0199212 A1 | 8/2009 | Schneider | |
| 2010/0008422 A1 | 1/2010 | Shimizu et al. | |
| 2010/0084482 A1 * | 4/2010 | Kennedy et al. | 236/51 |
| 2010/0107112 A1 | 4/2010 | Jennings et al. | |
| 2010/0161574 A1 | 6/2010 | Davidson et al. | |
| 2010/0197238 A1 | 8/2010 | Pathuri et al. | |
| 2010/0204834 A1 | 8/2010 | Comerford et al. | |
| 2011/0061527 A1 | 3/2011 | Sullivan | |
| 2011/0078515 A1 | 3/2011 | Yasukawa | |
| 2011/0093424 A1 | 4/2011 | Zimmermann et al. | |

(56) References Cited

U.S. PATENT DOCUMENTS

| | | | |
|---|---|---|---|
| 2011/0185895 | A1 | 8/2011 | Freen |
| 2012/0318073 | A1 | 12/2012 | Zavodny et al. |
| 2012/0318135 | A1 | 12/2012 | Hoglund et al. |
| 2012/0318137 | A1 | 12/2012 | Ragland et al. |
| 2012/0318138 | A1 | 12/2012 | Bisson et al. |
| 2012/0319851 | A1 | 12/2012 | Hoglund et al. |
| 2012/0323374 | A1 | 12/2012 | Dean-Hendricks et al. |
| 2012/0323375 | A1 | 12/2012 | Dean-Hendricks et al. |
| 2012/0323377 | A1 | 12/2012 | Hoglund et al. |

FOREIGN PATENT DOCUMENTS

| | | |
|---|---|---|
| EP | 0434926 | 8/1995 |
| EP | 0678204 | 3/2000 |
| EP | 0985994 | 3/2000 |
| EP | 1033641 | 9/2000 |
| EP | 1074009 | 7/2001 |
| EP | 1143232 | 10/2001 |
| EP | 2138919 | 12/2009 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/05251 | 7/2001 |
| WO | WO 01/79952 | 10/2001 |
| WO | WO 02/23744 | 3/2002 |
| WO | WO 10/21700 | 2/2010 |

OTHER PUBLICATIONS

Andrews et al., "Clicky: User-Centric Input for Active Spaces," 17 pages, Aug. 2004.
PG&E, "SmartAC Thermostat Programming Web Site Guide," 2 pages, prior to Sep. 7, 2011.
"Comfort™ Programmable Owner's Manual," Carrier Touch-N-Go™, 60 pages, 2010. Catalog No: 0M-TCPHP-4CA, Replaces: OM-TCPHP-3CA.
"CorAccess Systems/In Home," http://web.archive.org/web20011212084427/www.coraccess.com/home.html, 1 pages, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases.mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"Spotlight on integrated systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
AED Electronics, Inc., "Presenting Climatouch the Most Innovative Thermostat in the World!," 2 pages, prior to Nov. 30, 2007.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
U.S. Appl. No. 13/434,778, filed Mar. 29, 2012.
U.S. Appl. No. 13/325,300, filed Dec. 14, 2011.
U.S. Appl. No. 13/325,315, filed Dec. 14, 2011.
U.S. Appl. No. 13/325,503, filed Dec. 14, 2011.
U.S. Appl. No. 13/325,515, filed Dec. 14, 2011.
U.S. Appl. No. 13/325,525, filed Dec. 14, 2011.
U.S. Appl. No. 13/325,554, filed Dec. 14, 2011.
U.S. Appl. No. 13/325,617, filed Dec. 14, 2011.
U.S. Appl. No. 13/326,553, filed Dec. 15, 2011.
U.S. Appl. No. 13/415,743, filed Mar. 8, 2012.
U.S. Appl. No. 13/420,120, filed Mar. 14, 2012.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16 2002.
DESA Heating Products, "Wireless Hand-Held Remote Control Sets Models (C) GHRCB and (C)GHRCTB, Operating Instructions," 4 pages, May 2003.
Domotique Secant Home Automation—Web Page, available at http://www.secant.ca/En/Company/Default.asp, 1 page, printed Sep. 28, 2004.

(56) References Cited

OTHER PUBLICATIONS

Emme Core User Guide, Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer Users Manual, 22 pages, Downloaded May 24, 2012. 11-99.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Harris et al., "Optimizing Memory Transactions," Microsoft Research Havard University, 12 pages, May 25, 2012.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Installation Guide: Wireless Entry/Exit Remote," 12 pages, 2011.
Honeywell, Wireless Entry/Exit Remote, Operating Manual, 9 pages, 2011.
Honeywell, "Introduction of the 57350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "RedLINK™ Wireless Comfort Systems," RedLINK Wireless Technology, 8 pages, Aug. 2011. 50/1194 PR.
Honeywell, "Total Connect Online Help Guide," Revision A, 800-02577-TC, Mar. 2010.
Honeywell, "Total Connect User Guide," Revision B, 34 pages, May 15, 2012. K14741.
Honeywell, "VisionPRO® 8000 Thermostats," Honeywell International Inc., 2 pages, Downloaded May 24, 2012. http://yourhome.honeywell.com.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://hunter-thermostats.com/hunter_programmable_thermostats.html, Hunter Thermostat 44668 Specifications, and 44758 Specifications, 2 pages, Printed Jul. 13, 2011.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Model 44758 Remote Sensor," Owner's Manual, 2 pages, Revision Sep. 4, 2008. Form No. 44044-01.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Larsson, "Battery Supervision in Telephone Exchanges," Ericsson Components AB Sweden, 5 pages, Downloaded May 5, 2012. 9.14.
Lennox, "Network Control Panel (NCP)," User's Manual, 18 pages, Nov. 1999.
Lennox, "Prodigy Control System," Lennox Industries, 4 pages, May 25, 2012. (63W21)-01/11.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
METASYS, "HVAC PRO for Windows User's Manual," 308 pages, 1998.
Mounting Template for Ritetemp Thermostat 8082, 1 page, 2002.
OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. B02WAD1, 2 pages, Jun. 2002.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276. Revised Jul. 20, 2008.
Screenshot of http://lagotek.com/index.html?currentSection=TouchIt, Lagotek, 1 page, prior to Mar. 29, 2012.

(56) References Cited

OTHER PUBLICATIONS

Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 22 pages, 2000.
Trane, "System Programming, Tracer Summit Version 14, BMTW-SVP01D-EN," 623 pages, 2002.
Trane, "Wireless Zone Sensor. Where Will Wireless Technology Take You?," 4 pages, Feb. 2006.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.

* cited by examiner

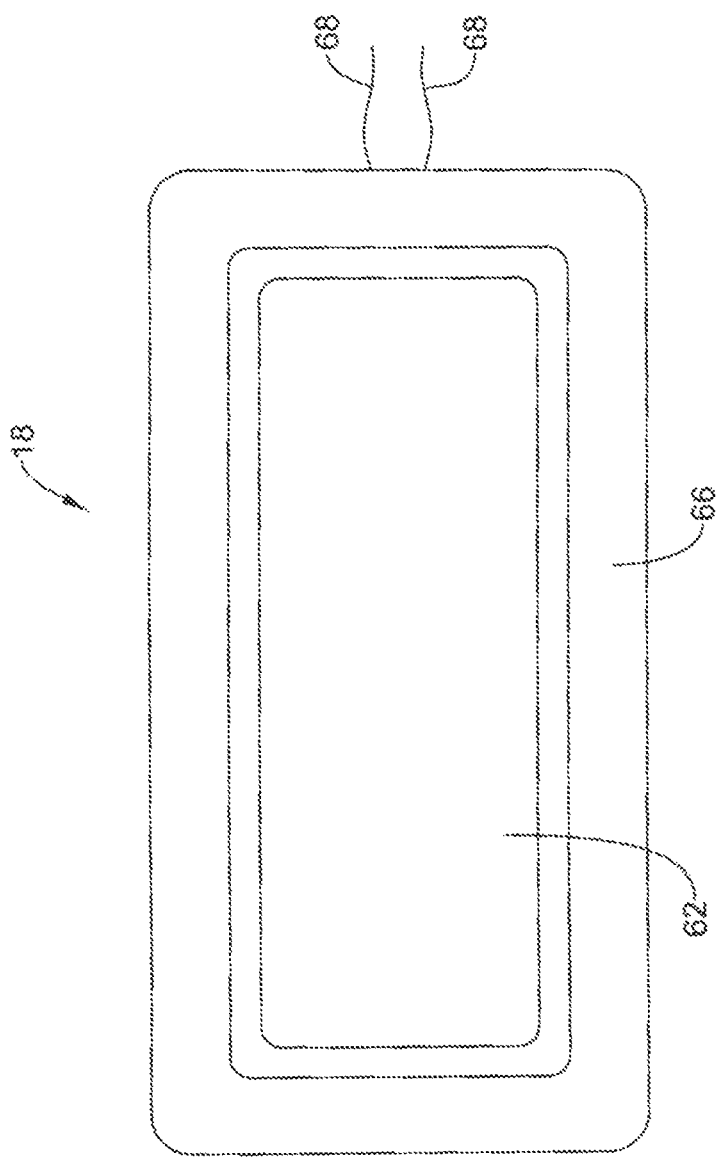

HVAC CONTROLLER INCLUDING USER INTERACTION LOG

TECHNICAL FIELD

This disclosure relates generally to HVAC systems, and more particularly, to HVAC controllers that are used for controlling HVAC systems.

BACKGROUND

Heating, ventilation, and/or air conditioning (HVAC) systems are often used to control the comfort level within a building. Such HVAC systems typically include an HVAC controller that controls various HVAC components of the HVAC system in order to affect and/or control one or more environmental conditions within the building. When an HVAC system is not operating properly, a HVAC contractor may be called to determine the source of the problem. In some cases, the HVAC system is not entirely the source of the problem. Rather, the problem may have been caused, at least in part, by a user's actions or inactions with respect to the HVAC system. Diagnosing the source of such problems can be difficult.

SUMMARY

This disclosure relates generally to HVAC systems, and more particularly, to HVAC controllers that are used for controlling such HVAC systems. In some illustrative embodiments, an HVAC controller may be configured to record or log at least some user interactions with the HVAC controller in a user interaction log. Subsequently, the HVAC controller may recall at least some of the user interactions from the user interaction log, and display the recalled user interactions. In some cases, the HVAC controller may be a thermostat that includes a temperature sensor for sensing an ambient temperature at or near the thermostat, but this is not required.

In one illustrative embodiment, an HVAC controller is configured to control one or more components of an HVAC system. The HVAC controller may include a user interface, a memory and a controller. The user interface may include a display and may be configured to accept one or more user interactions of a user of the HVAC controller during operation of the HVAC controller. In some instances, the controller may be coupled to the memory and the user interface, and may be programmed to log at least some of the user interactions that are accepted by the user interface into a user interaction log stored in the memory. The controller may be further programmed to recall at least some of the user interactions, and to display the recalled user interactions on the display of the user interface. The display may be a touch screen display or a non-touch screen display. Also, the user interface may include one or more buttons that are separate from the display, but this is also not required, particularly when the display is a touch screen display.

The user interactions that are logged by the controller may by any suitable user interaction. For example, the user interactions that are logged may include, but are not limited to, a user temperature setting change, a system/fan mode change, a response to an alert, an installer setting change, a programmable schedule change, a date/time change, an indoor air quality change, a user preference changes, a maintenance change, a user interaction that occurs from a remote location, and the like. In some cases, the user interaction log may include a description of at least some of the user interactions that are logged in the user interaction log. Alternatively, or in addition, the user interaction log may include a time and/or date of at least some of the user interactions that are logged in the user interaction log.

In some instances, at least one of the user interactions may correspond to a user's response to an alert that is displayed by the HVAC controller on the display of the user interface. In some cases, the alert may be a maintenance alert that allows a user to select between two or more options in response to the maintenance alert. Selection of one of the two or more options may correspond to the user's response to the maintenance alert. The maintenance alert can be any sort of maintenance alert, such as a filter change reminder alert, a replace battery reminder alert, an HVAC performance alert and/or any other suitable alert.

In some cases, the controller may be programmed to classify at least some of the user's interactions into two or more classes. Once classified, the controller may be programmed to allow a user to select a particular class. Once selected, the controller may be programmed to recall at least some of the user's interactions that fall within the selected class, and to display the recalled user interactions of the selected class on the display of the user interface. In some cases, at least some of the user interactions that are not classified in the selected class are not displayed.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 3 is a front view of an illustrative HVAC controller;

Figure 1:
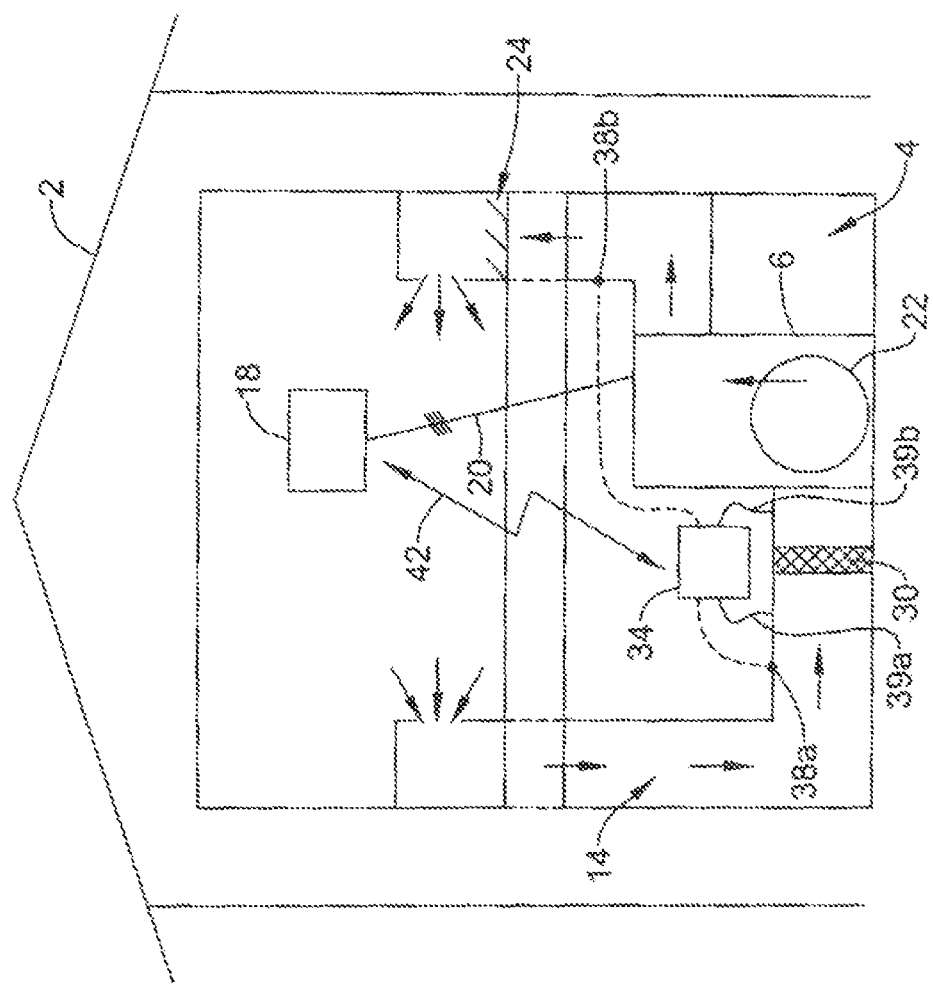
FIG. 1 is a schematic view of an illustrative HVAC system located within a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the claimed disclosure.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, or any other suitable type of HVAC system, as desired. The HVAC system 4 of FIG. 1 includes one or more HVAC components 6, a system of ductwork and air vents including a supply air duct 10 and a return air duct 14, and one or more HVAC controller 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g., forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g., forced warm air furnace) for heating via return air ducts 14. Similarly, when a cool call signal is provided by the HVAC controller(s) 18, an HVAC component 6 (e.g., air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g., air conditioning unit) for cooling via return air ducts 14.

In some cases, the system of vents or ductwork 10 and/or 14 can include one or more dampers 24 to regulate the flow of air. For example, one or more dampers 24 may be coupled to one or more of the HVAC controller 18 and can be coordinated with the operation of one or more HVAC components 6. The one or more HVAC controller 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC components 6.

In many instances, one or more air filters 30 may be used to remove dust and other pollutants from the air inside the building 2. In the illustrative example shown in FIG. 1, the air filter(s) 30 is installed in the return air duct 14 to filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature ($\Delta T$) between a return air side and discharge air side of the HVAC system 4. For example, the equipment interface module 34 may include a first temperature sensor 38a located in the return (incoming) air duct 14 and a second temperature sensor 38b located in the discharge (outgoing or supply) air duct 10. In other cases, the equipment interface module 34 may include a differential pressure sensor including a first pressure tap 39a located in the return (incoming) air duct 14 and a second pressure tap 39b located downstream of the air filter 30 to measure a change in a parameter related to the amount of flow restriction through the air filter 30. For example, in some cases, the equipment interface module 34 may include an air filter monitor. In still other cases, the equipment interface module 34, when provided, may include at least one flow sensor that is capable of providing a measure that is related to the amount of air flow restriction through the air filter 30. These are just some examples.

When provided, the equipment interface module 34 may be configured to communicate with the HVAC controller 18 via, for example, a wired or wireless communication link 42. The equipment interface module 34 may communicate, relay or otherwise transmit data regarding the selected parameter (e.g., temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature between the return air side and the discharge air side of the HVAC system 4 to a previously determined ΔT limit stored in the HVAC controller 18. In other cases, the HVAC controller 18 may be configured to display information regarding the status of the air filter 30 to a user, based on data received from an air filter monitor.

Figure 2:
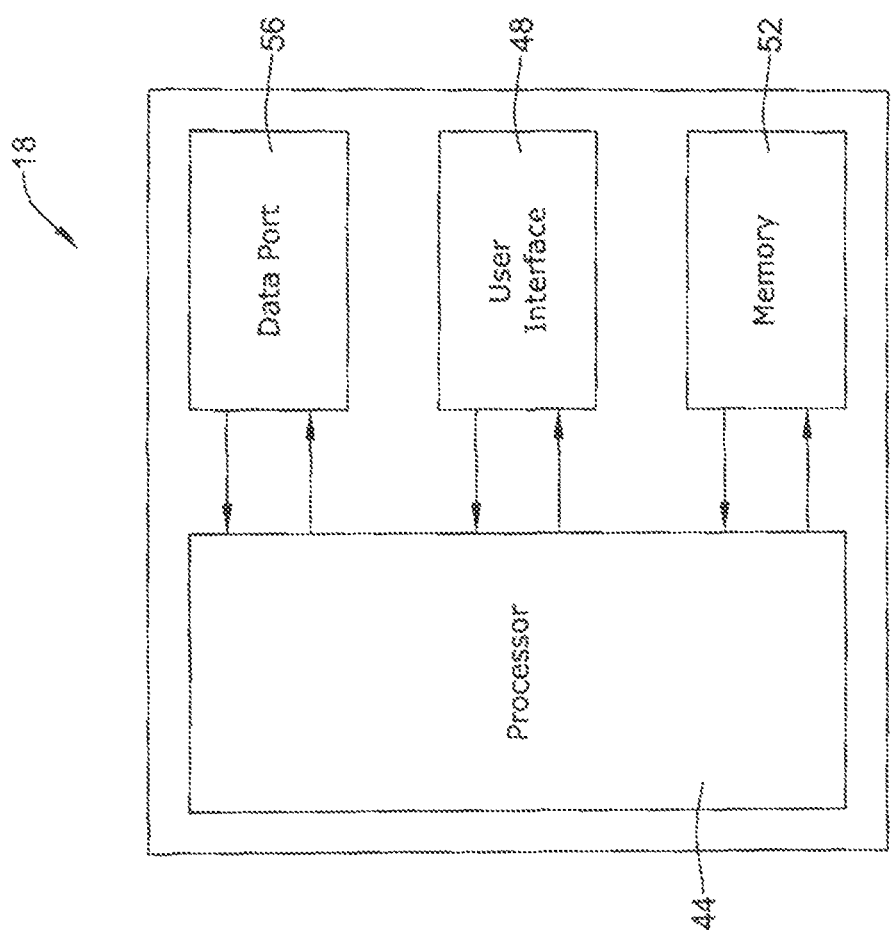
FIG. 2 is a schematic view of an illustrative HVAC controller.

FIG. 2 is a schematic view of an illustrative HVAC controller 18. In some instances, HVAC controller 18 may be a thermostat, but this is not required. In the illustrative embodiment of FIG. 2, HVAC controller 18 includes a processor (e.g., microprocessor, microcontroller, etc.) 44, a user interface 48 and a memory 52. The processor 44 may operate in accordance with an algorithm that controls or at least partially controls one or more HVAC components 6 of an HVAC system such as, for example, HVAC system 4 shown in FIG. 1. The processor 44 may, for example, operate in accordance with an algorithm that provides temperature set points, starting and/or ending times, and the like. In some cases, HVAC controller 18 may include a timer (not shown). The timer may be integral to the processor 44 or may be provided as a separate component.

In the illustrative embodiment of FIG. 2, user interface 48 may be any suitable interface that permits controller 18 to display and/or solicit information, as well as accept one or more user interactions with the controller 18. For example, the user interface 48 may permit a user to enter data such as temperature set points, humidity set points, starting times, ending times, responses to alerts, and the like. In some cases, user interface 48 may include a display and a distinct keypad. A display may be any suitable display. In some instances, a display may include or may be a liquid crystal display (LCD), and in some cases a dot matrix LCD display. If desired, user interface 48 may be a touch screen LCD panel that functions as both display and keypad. In some instances, a touch screen LCD panel may be adapted to solicit values for a number of operating parameters and/or to receive such values, but this is not required.

The memory 52 of the illustrative controller 18 may be in communication with the processor 44. Memory 52 may be used to store any desired information, such as the aforementioned control algorithm, set points, differential pressure limits, and the like. Memory 52 may be any suitable type of storage device including, but not limited to, RAM, ROM, EPROM, flash memory, a hard drive, and/or the like. In some cases, processor 44 may store information within memory 52, and may subsequently retrieve the stored information.

In some cases, processor 44 may be programmed to record and store information pertaining to a user's interaction with the HVAC controller 18 in the memory 52. The processor 44 may also be programmed to recall information pertaining to a user's interactions stored in the memory 52. The processor 44 may also be programmed to display the recalled interactions on a display of the user interface 48, in response to a user's request. In some cases, the processor 44 may be programmed to identify and classify the user interactions such that the user interaction(s) recorded in the user interaction log stored in the memory 52 may be searchable by class. That is, the processor 44 may classify a user interaction into one or more identifiable classes. The information that may be stored in a user interaction log may be accessed and recalled through the user interface 48, and in some cases displayed on a display of the user interface 48, as will be described in greater detail below.

The user interactions may be related to any number of things. For example, the user interactions may be related to a temperature set point change, a humidity set point change, a programmable schedule change, a date/time change, an indoor air quality setting change, a system mode change, a fan setting change, a filter change reminder, a battery change reminder, a user override of a pre-determined schedule (temporary or permanent), an installer setting change, a change initiated from a remote location such as, for example, changes initiated via a remote or internet gateway, among others. In some cases, the user interactions may be related to a user's response to a fault or alert that is displayed by the HVAC controller 18, among others. For example, the controller 18 may display an alert on a display of the user interface 48. In some cases, the alert may be related to the performance of the HVAC system 4 such as, for example, when a pre-determined limit for a selected operational parameter has been exceeded. This may be referred to as a performance related alert. In other cases, the alert may be a maintenance alert that may signify to the user that some maintenance of the HVAC system 4 is needed. For example, the alert may indicate that a filter change is needed, that a battery change is needed, or that a UV bulb change is needed. These are just examples. In some cases, the controller 18 may display two or more options to the user for responding to an alert, but this is not required. For example, when the controller 18 displays an alert indicating that a filter change is needed, the controller may display selectable options permitting the user to snooze the alert or to indicate that the filter has been changed. In other cases, the controller 18 may display an option that permits a user to ignore or delete an alert. The processor 44, as described above, may record the user's response to the alert, and store the user's response in the memory 52. In some cases, the processor 44 may record the data and time the alert was displayed, and the option that was selected by the user in response. This information may be recorded in a user interaction log stored in the memory 52 such that it may be recalled and displayed at a later time, sometimes in response to a user's (e.g. contractor's) request.

The processor 44 may be configured to record and store information relating to a number of user's interactions over an extended period of time. For example, the processor 44 may be configured to record and store information relating to a user's interactions over a period of 30 days, 60 days, 90 days, 180 days, 365 days, or more. In other cases, the processor 44 may be configured to record and store information relating to at least 30 user interactions and, in some cases, more than 100 user's interactions in the user interaction log. It will be generally recognized that the amount of information that can be stored in the memory 52 is only limited by the size of memory 52.

Information pertaining to a user's interactions with the HVAC controller 18 may be stored in a user interaction log contained within the memory 52. In some cases, the information pertaining to the user's interactions with the HVAC controller may include a short text string describing the corresponding user's interaction, which may then be displayed on the display to a user (e.g. contractor), as will be described in further detail. The user interaction log may also associate a time and/or date with the user's interaction. Keeping a record or log of a user's interactions with the HVAC controller 18 over time may assist a contractor with troubleshooting problems associated with the HVAC system. In some cases, for example, the contractor may analyze the user interaction log to determine if a user's interactions may have contributed, at least in part, to the alleged poor or improper operation of the HVAC system 4.

In some cases, as illustrated in FIG. 2, HVAC controller 18 may include a data port 56. Data port 56 may be a wireless port such as a Bluetooth™ port or any other wireless protocol. In other cases, data port 56 may be a wired port such as a serial port, a parallel port, a CAT5 port, a USB (universal serial bus) port, or the like. In some instances, data port 56 may be a USB port and may be used to download and/or upload information from a USB flash drive. Other remote devices may also be employed, as desired.

Data port 56 may be configured to communicate with processor 44 and may, if desired, be used to either upload information to processor 44 or to download information from processor 44. Information that can be uploaded or downloaded may include values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be transferred to other similar thermostats. In some cases, data port 56 may be used to upload and/or download information pertaining to an HVAC dealer or contractor. In some cases, data port 56 may be used to download data stored within the memory 52 for later analysis. For example, data port 56 may be used to download the user interaction log or parts thereof to a remote device such as a personal computer, laptop, iPAD® or other tablet computer, PDA, smart phone, or other remote device, as desired. In some cases, the data may be convertible to an MS EXCEL® or MS WORD® file, but this is not required.

FIG. 3 is a front view of HVAC controller 18 according to one illustrative embodiment. In the illustrative embodiment of FIG. 3, HVAC controller 18 may include a display 62 that is disposed within a housing 66 but viewable from external to the housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, and the like to be displayed anywhere on the LCD, rather than being confined to predetermined locations such as is the case with a fixed segment LCD display. Housing 66 may be formed of any suitable material, such as a polymeric material. In some cases, the housing 66 may be formed such that it defines a data port 56 (see FIG. 2). The housing 66 may also include suitable wiring and/or other electrical connections 68 such that the controller 18 may be electrically coupled to the building 2 and/or HVAC system 4.

In some cases, HVAC controller 18 may be configured to provide substantial display and/or programming functionality, but this is not required. In some cases, HVAC controller 18 may be configured to display a default display, referred to herein as a home screen, that is displayed by HVAC controller 18 when no other data entry is underway for a period of time. FIG. 4 provides an example home screen 72 that may be displayed by HVAC controller 18. In some cases, home screens may include screens that can be accessed by a top level navigational menu. A home screen may, if desired, display one or more parameters relating to environmental conditions such as indoor and/or outdoor air temperature and/or humidity, expected weather conditions, and/or the status of equipment that is at least partially controlled by HVAC controller 18.

Figure 4A:
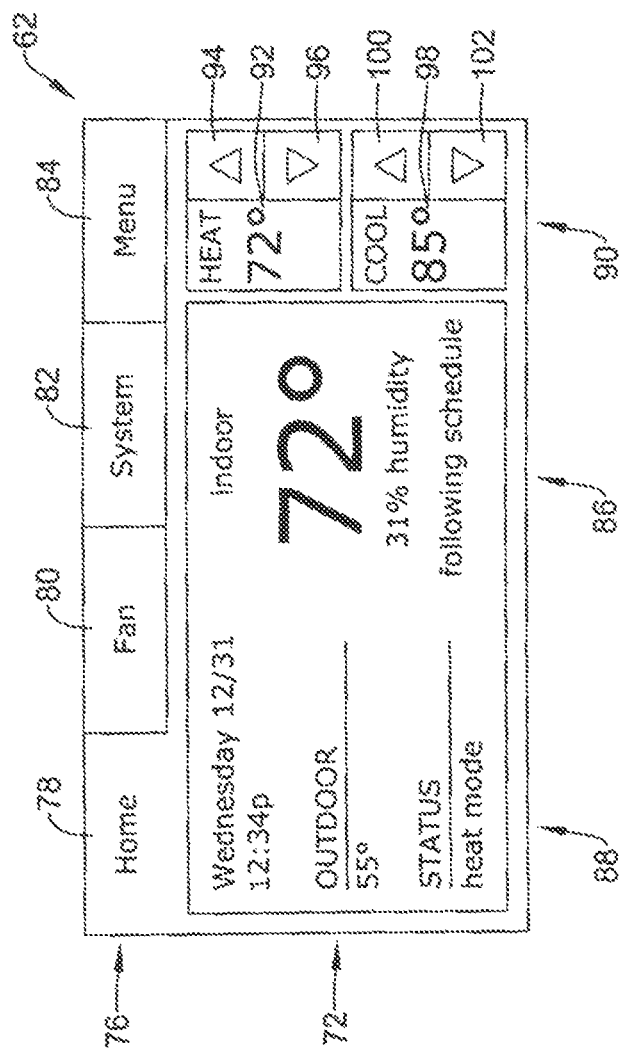
FIG. 4A-4C provide illustrative examples of home screens that may be displayed upon the HVAC controllers of FIGS. 2 and 3.

FIG. 4A shows one such home screen 72. The illustrative home screen 72 of FIG. 4 includes a navigational bar 76 along the top. Navigational bar 76 may be considered as providing top level navigation, but this is not required. In some cases, if desired, navigational bar 76 may include one or more of a HOME button 78, a FAN button 80, a SYSTEM button 82 and/or a MENU button 84. FIG. 4A is an example of a screen that may be displayed after a user has pushed HOME button 78, or when no other data entry is underway for a period of time. Additionally, through home screen 72 the user may access one or menus from which the user may make a temperature set point change, a humidity set point change, an indoor air quality change, a programmable schedule change, a system mode change, a fan setting change, an installer setting change, among others. Such changes may be considered a user interaction.

In some cases, home screen 72 may be considered as having two or more regions. For example, home screen 72 may include a first region 86 and a second region 88. In some instances, first region 86 may be considered as displaying or otherwise providing primary information, while second region 88 may be considered as displaying or otherwise providing secondary information. In some cases, primary information may be information that is considered to be more important, more interesting and/or more useful than secondary information. To illustrate, first region 86 may display one or more of a current air temperature reading, a current indoor humidity, a schedule status, and the like. Second region 88 may display one or more of a date and time, an outdoor air temperature reading, an outdoor humidity reading, an equipment status, and the like.

Home screen 72 may also include a third region 90 that may be used for displaying and/or adjusting a parameter value such as a parameter that is displayed within first region 86 of home screen 72. In some cases, for example, third region 90 may, as illustrated, display both a heating temperature set point and a cooling temperature set point, but this is not required. Third region 90 may display a first parameter 92, a first up arrow 94 and a first down arrow 96. Third region 90 may also display a second parameter 98, a second up arrow 100 and a second down arrow 102. First parameter 92 may be adjusted up or down by a user using first up arrow 94 and/or first down arrow 96, as appropriate. Second parameter 98 may be adjusted up or down by a user using second up arrow 100 and/or second down arrow 102, as desired.

In some cases, controller 18 may be configured to display a user alert on the display 62 which may prompt the user to take action. In one case, a user alert may be displayed when the controller 44 determines that system maintenance is needed. For example, controller 44 may determine that a filter change is necessary, a battery change is necessary, a UV bulb change is necessary or some other maintenance is necessary that requires the user's attention. In another case, the controller 18 may display a user alert indicating that the HVAC system 4 is operating outside of a predetermined set of normal operating parameters. Such an alert, for example, may be displayed when the HVAC system 4 has exceeded a predetermined $\Delta T$ limit stored in the controller memory 52 for either a heating or a cooling mode. A user's response (or, in some cases, absence of a response) also may be considered a user interaction.

Figure 4B:
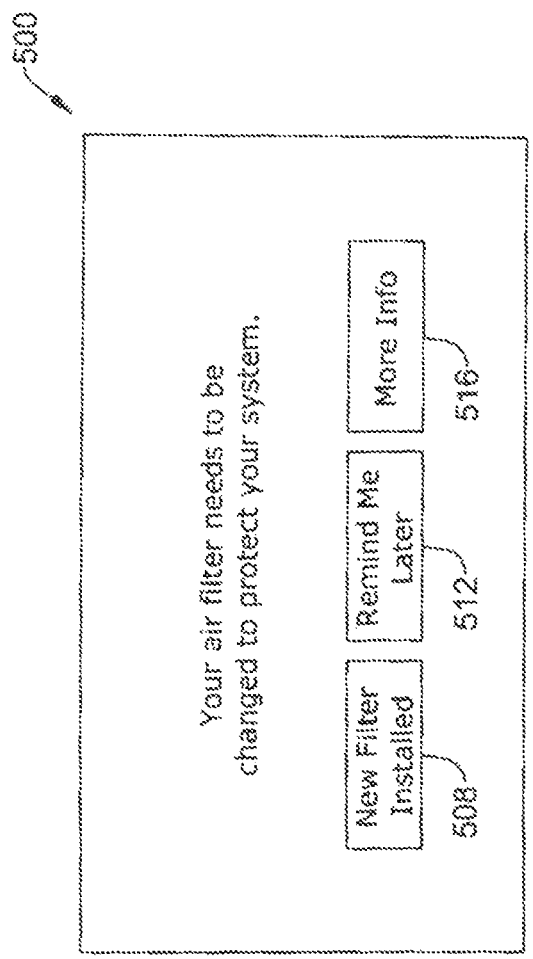

FIG. 4B provides an illustrative home screen 500 that may be displayed when the controller 18 determines that a filter change is needed. Home screen 500 may display a user alert 504 indicating that an air filter change is needed. Home screen 500 may also provide at least one selectable option for responding to the user alert. For example, home screen 500 may include a first button 508 labeled "New Filter Installed," "Filter Changed," or "Test New Filter" that, when selected, may indicate that the user has changed the air filter in response to the user alert. Home screen 500 may also include a second button 512 that, when selected, initiates a snooze function that may temporarily remove the user alert for a predetermined period of time. The second button 512 may be labeled "Snooze", "Remind me later", "Delay", "Dismiss", and the like. Additionally, in some cases, home screen 500 may also include a button 516 labeled "More Info" or "Help" that, when selected, may cause the controller 18 to display information regarding the displayed alert. The user's selection of either the first button 508 or the second button 512 may be regarded as a user interaction.

Figure 4C:
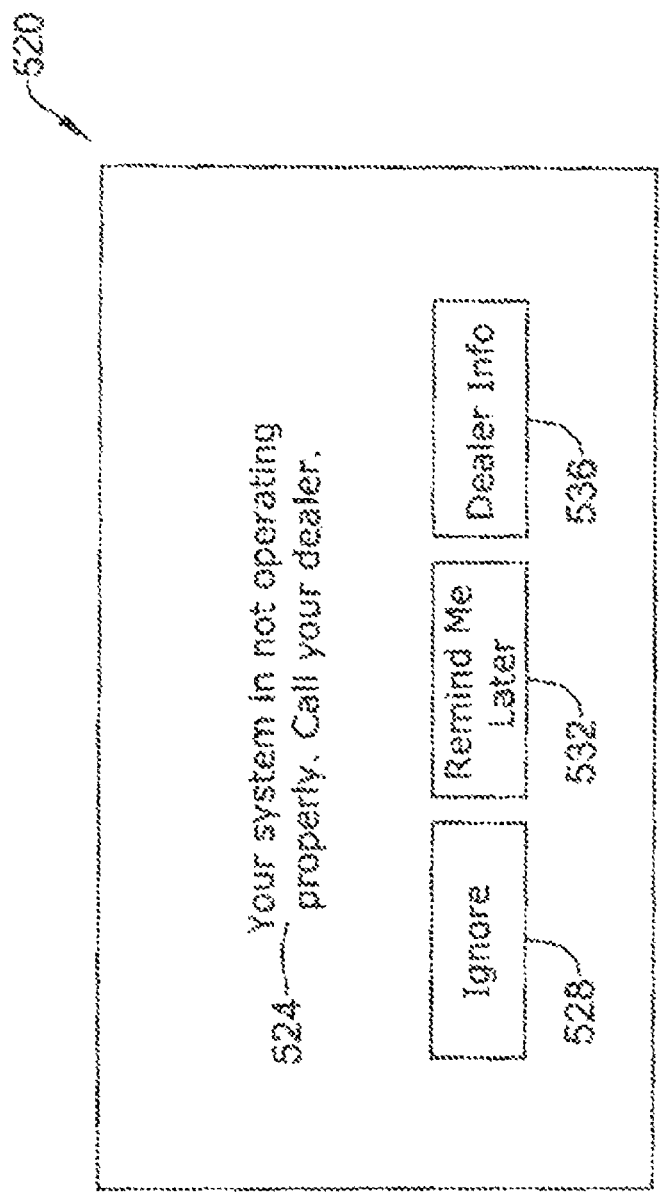

FIG. 4C provides another illustrative home screen 520 that may be displayed when the controller 18 determines that the HVAC system 4 has exceeded its normal operating parameter such as when, for example, the HVAC system is operating outside of a predetermined ΔT limit in either the cooling or the heating mode. As shown in FIG. 4C, home screen 520 may display a user alert 524 indicating that the HVAC system 4 is not operating properly. In some cases, the user alert may also prompt the user to call their dealer or repair personnel. Home screen 530 may also provide one or more selectable options for responding to the user alert 524. For example, home screen 520 may include a first button 528 that, when selected, dismiss or ignores the alert. Home screen 520 may also include a second button 532 that, when selected, initiates a snooze function that may temporarily remove the user alert for a predetermined period of time. The second button 532 may be labeled "Snooze", "Remind me later", "Delay", "Dismiss", and the like. Additionally, home screen 520 may include a button 536 labeled "Dealer Information" that, when selected, may display the dealer's contact information.

Figure 5:
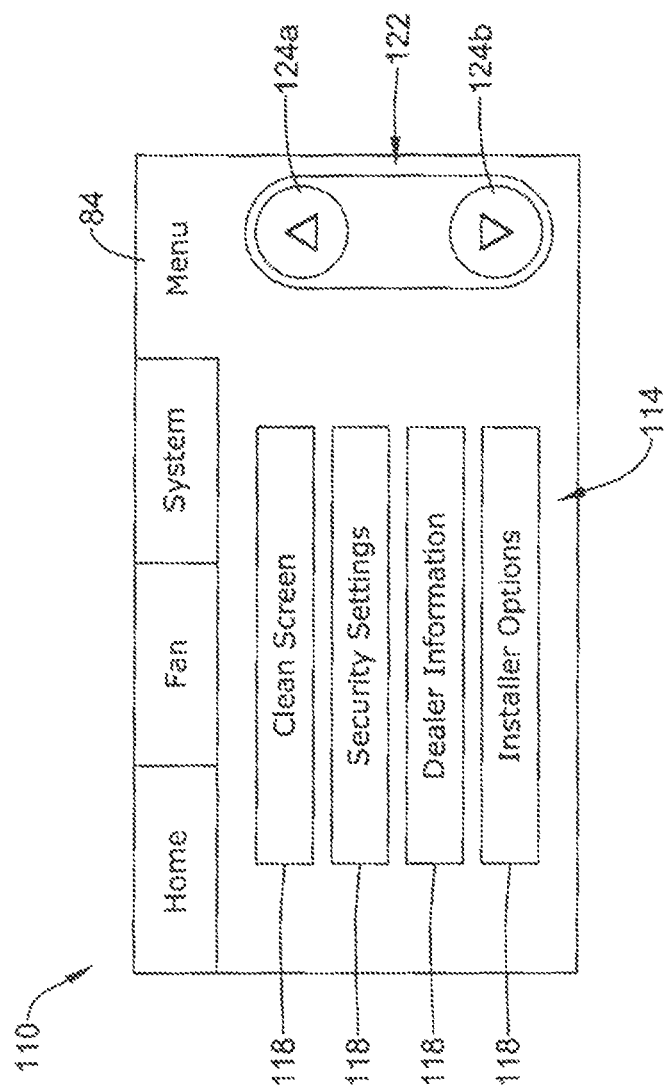
FIGS. 5-17 provide several illustrative examples of screens that maybe displayed upon the HVAC controllers of FIGS. 2 and 3 when in use.

FIGS. 5-17 show illustrative screens that may be displayed when a contractor or other user may be attempting to access a user interaction log stored in the memory 52 of the HVAC controller 18. Selecting the MENU button 84 on home screen 72 of FIG. 4 may cause the menu screen 110 of FIG. 5 to be displayed. The illustrative menu screen 110 may include a table 114 that has one or more selectable menu options 118 that may be selected by a user. In some cases, the table 114 may be a scrolling table, in which case the menu screen 110 may also include a scroll bar 122 including first and second arrows 124a, 124b that may facilitate a user in scrolling through the available menu options 118.

Figure 6:
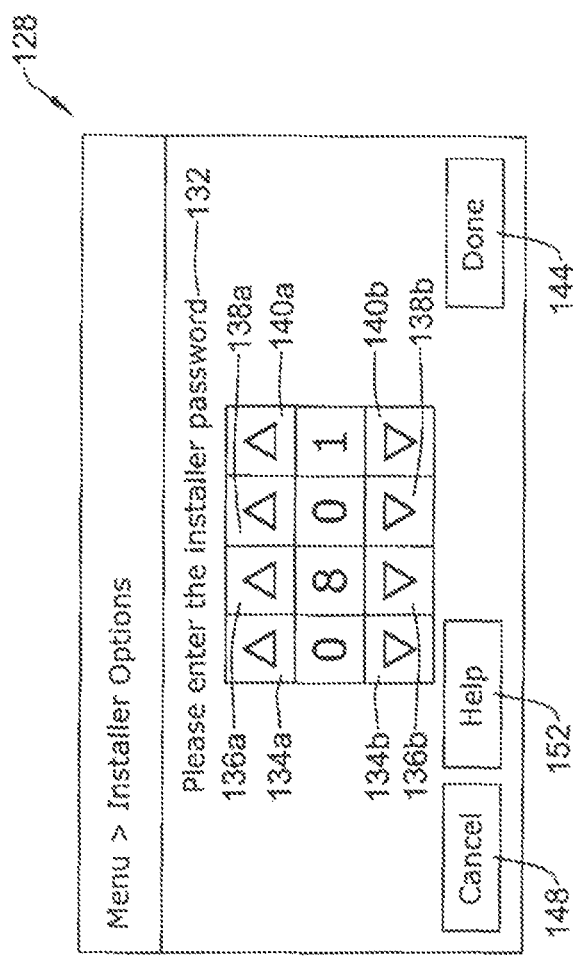

Upon selection of the INSTALLER OPTIONS menu options 118, the illustrative controller 18 may be configured to display a password prompt screen 128, as illustrated in FIG. 6. The password prompt screen 128 may include a user prompt 132 that may prompt the user to enter a user login ID which may include a user name and/or password. In some cases, certain rights may be associated with different user login IDs or passwords. For example, a homeowner may have a different login ID and different user rights than an HVAC contractor. The user login ID and/or password may include any combination of alphanumeric characters. In one example, as illustrated in FIG. 6, the password may be a sequence of numbers. The sequence of numbers may be adjusted to the correct sequence using corresponding arrow keys. The user may then select the DONE button 144 to confirm entry of the password. In some cases, the password prompt screen 128 may include a CANCEL button 148, which upon its selection may cancel the user's current actions and return the user to the previous screen, such as the menu screen 110 of FIG. 5. In some cases, the password prompt screen 128 may include a HELP button 152. Selection of the HELP button 152 may cause the controller 18 to display additional information about the currently displayed screen. Sometimes this information screen may appear on an additional screen or a pop-up screen that overlays the current screen, but this is not required.

Figure 7:
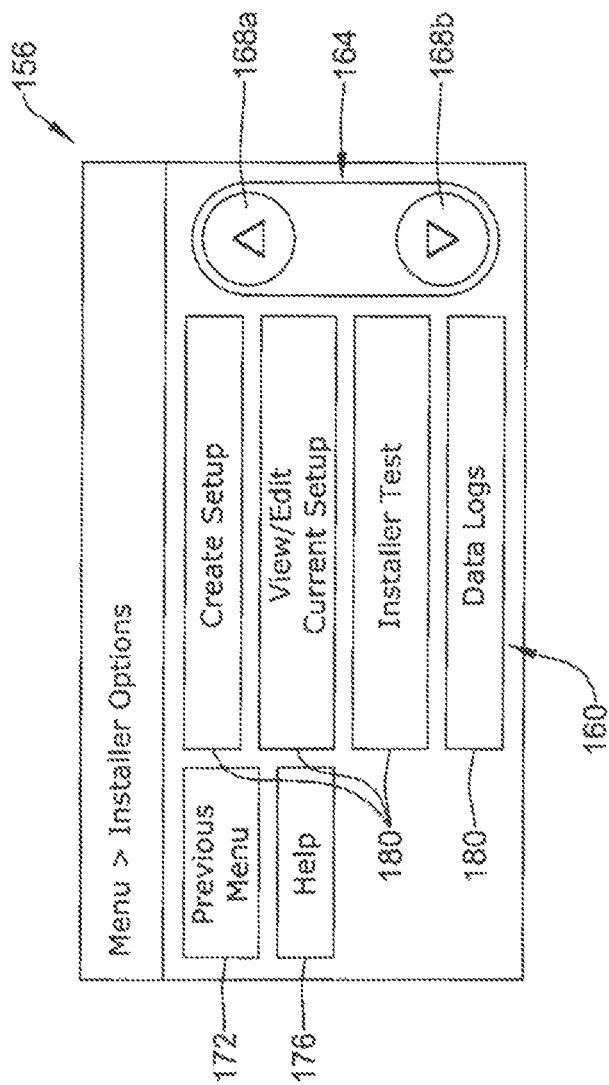

Upon selection of the DONE button 144 confirming entry of a password, the controller 18 may confirm that a valid password has been entered. If a valid password has been entered, the controller 18 may display an installer options menu screen 156, such as illustrated in FIG. 7. Like the previous menu screen 110, the installer options menu screen 156 may include a table 160 including one or more installer options. In some cases, the table 160 may be a scrolling table, in which case the installer options menu screen 156 may also include a scroll bar 164 having first and second arrows 168a, 168b that may facilitate a user to scroll through and view the available installer options presented in table 160. The installer options menu screen 156 may also include a BACK button or PREVIOUS MENU button 172 which, when selected, may cause menu screen 110 of FIG. 5 to be displayed. Additionally, in some cases, the installer options menu screen may include a HELP button 176, which when selected, may cause additional information pertaining to the currently displayed screen to be displayed.

Figure 8:
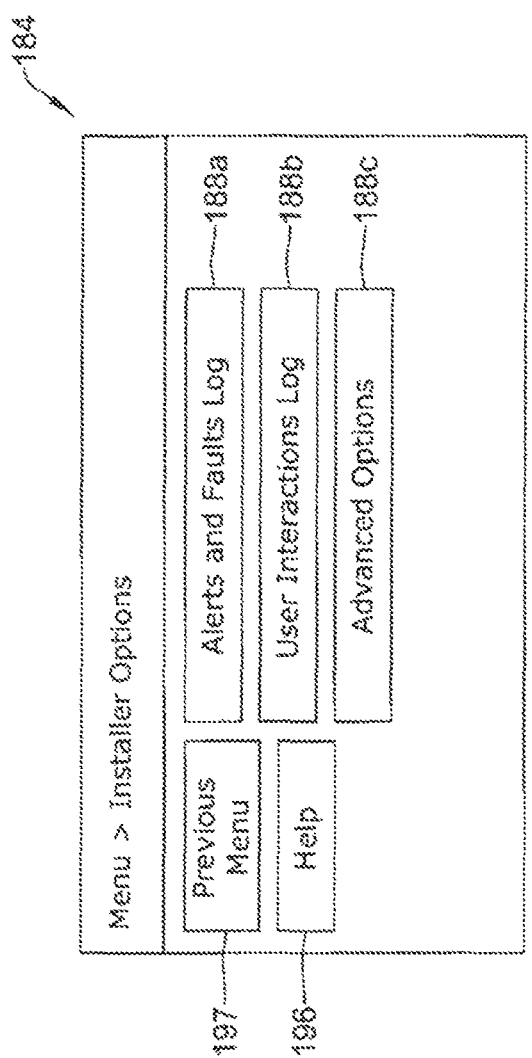

In many cases, the table 160 may include one or more installer options 180 that may be selected by the user. In some cases, a DATA LOGS option 180 may be provided, which may provide access to a user interaction log stored in the HVAC controller's memory 52. In some instances, selection of the DATA LOGS option 180 may cause a data logs menu screen 184 to be displayed by the controller 18, as shown in FIG. 8. The data logs menu screen 184 may display one or more data log options 188a-188c that may be selected. The data logs menu screen 184 may include a back button or a PREVIOUS MENU button 197, which when selected, may return the user to the installer options menu screen 156 illustrated in FIG. 7. The data logs menu screen 184 may include a HELP button 196 that when selected may cause additional information pertaining to the currently displayed screen to be displayed.

Figure 9:
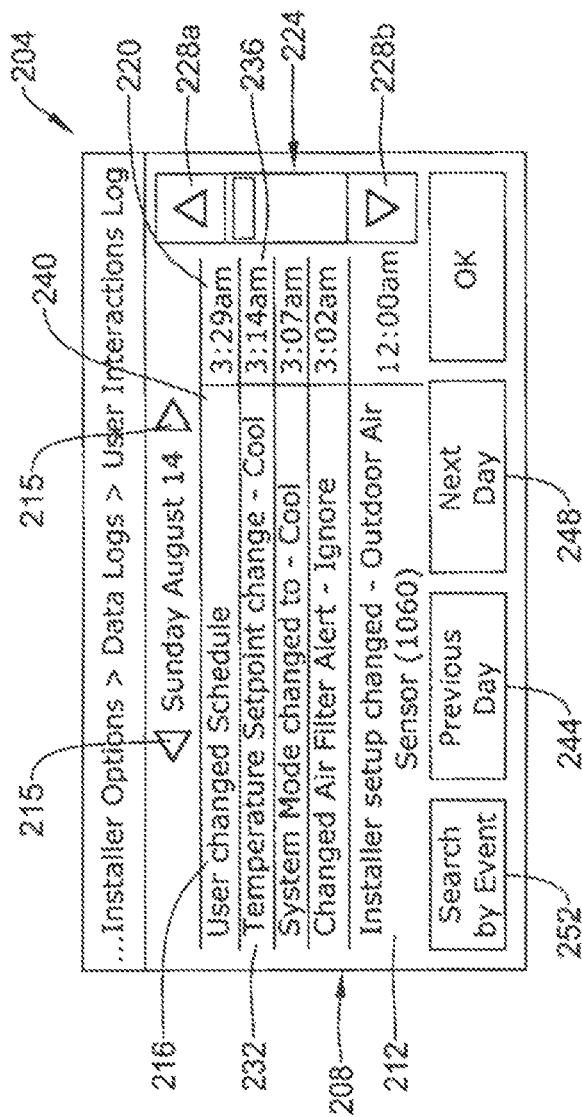

A user may select the USER INTERACTION LOG option 188b to access a user interaction log stored in the HVAC controller memory 52. In some instances, upon selection of the USER INTERACTION LOG option 188b, the controller 18 may display a user interaction log screen 204, such as that shown in FIG. 9. The user interaction log screen 204 may display a user interaction log 208. In some case, the user interaction log 208 may be presented in a table 212. In some illustrative embodiments, the table 212 may include a first column 216 and a second column 220. In some cases, the table 212 may be a scrolling table, in which case the user interaction log screen 204 may include a scroll bar 224 having first and second arrows 228a, 228b to facilitate navigation of the table 212 to view additional user interaction log entries. In some cases, the first column 216 may include a short text string 232 describing the user's interaction of that entry. For example, as illustrated in FIG. 9, the user interaction log 208 may include a text string 232 which may describe the user's interaction as a "Temperature set point change—Cool", indicating that a user changed the temperature set point related to the cooling mode. In some cases, the second column 220 may include a time stamp 236 associated with the temperature set point change, sometimes adjacent the short text string 232 describing the user interaction entry. Additionally, in some cases, the user interaction log 208 may also indicate if the user interaction was initiated from a remote location such as, for example, via a remote control or internet gateway. If multiple user interaction entries are contained within the table 212, the most recent log entry may appear at the top 240 of the table 212, as illustrated in FIG. 9, although this is not required.

In some cases, the user interaction log 208 may include user interactions that occurred during a selected time period. The selected time period may be a day, a week, a month, a 90 day period, a 180 day period, a 365 day period (year), or any other suitable time period. In some cases, as illustrated in FIG. 9, the selected time period may be a 24 hour time period (day). The user interaction log screen 204 may include a one or more buttons 215 for navigating forward and/or backward between different viewable time periods. Depending on the implementation, the viewable time period may correspond to individual days, weeks, months, a 90 day period, a 180 day period, a 365 day period, or any other suitable time period. In some cases, for example as illustrated in FIG. 9, the user interaction log screen 204 may include a PREVIOUS DAY button 244 and a NEXT DAY button 248, which may permit a user to view the user interaction log 208 for different days. The user may continue to select either the PREVIOUS DAY button 244 and/or the NEXT DAY button 238 until the user interaction log 208 for a desired day is displayed by the controller 18.

In some cases, the user interaction log 208 may be searchable. Searching the user's interactions log may be useful when a significant number of user interactions have been recorded and logged over an extended period of time. In some cases, searching the user's interactions log may be useful to identify certain user interactions that a contractor suspect could explain the systems behavior.

As described above, when a user interacts with the controller 18, the processor 44 may be configured to identify and then classify the user's interactions into one or more different event types or classes. A user's interactions may be identified and classified as relating to any number of event types including, but not limited to, user initiated temperature setting changes, user initiated system/fan mode changes, faults/alerts viewable by a user, a user's response to an alert or fault, user initiated installer setting changes, user initiated programmable schedule changes, user initiated date/time changes, user initiated indoor air quality setting changes, user initiated change that may affect indoor quality, user preference changes, maintenance changes carried out by a user, and the like. A user-initiated change may be a user interaction that is initiated from a remote location such as, for example, via a remote control or internet gateway. Assigning the user interactions to a certain class (or classes) when it is recorded and logged into the memory 52 may permit the user interaction log 208 to be more easily searched, such as by the event type. In some cases, a user interaction may be assigned to two or more classes when it is recorded and logged into the memory 52. In some cases, the user interaction log 208 may indicate whether or not the change was initiated from a remote location.

In some cases, the user interaction log 208 may be searched using multiple search criteria. In some cases, the user interaction log screen 204 may include a button 252 labeled SEARCH or SEARCH by event that, when selected, may result in a search screen 256 being displayed by the controller 18, such as illustrated in FIG. 10.

Figure 10:
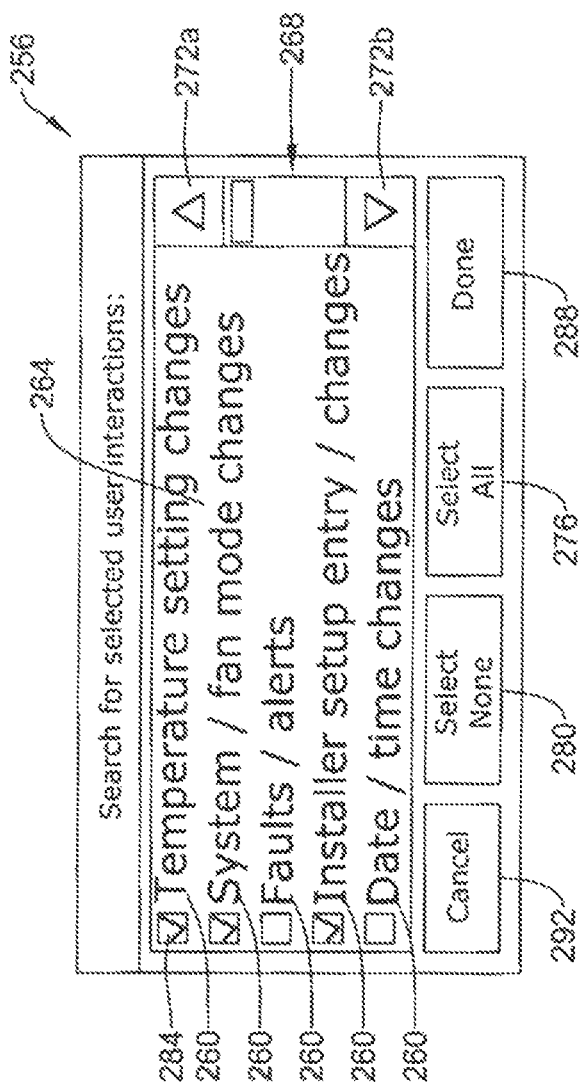

As illustrated in FIG. 10, a search screen 256 may include a number of selectable search options 260. In some cases, the selectable search options 260 may correspond to one or more of the classes used by the processor 44 to identify and classify the user interactions. For example, the search options may include classes of event types relating to a user's temperature setting changes, system/fan mode changes, faults/alerts, installer setting changes, schedule changes, date/time changes, indoor air quality setting changes, user preference changes, maintenance changes, a user-initiated change that occurs from a remote location, and the like. The search options 260 may be listed in a table 264. In some cases, the table 264 is a scrolling table, in which case the search screen 256 may include a scroll bar 268 and first and second arrows 272a, 272 for navigating the table 264.

In some cases, the search options 260 may be individually selectable, such that selection of a first search option does not affect the selection of subsequent search options. In other cases, the search screen may include one or more quick select buttons 276, 280 that, when selected, may select or deselect a grouping of search options 260. In some cases, for example as illustrated in FIG. 10, the search screen 256 may include a SELECT ALL button 276 that, when selected, selects all available search options 260, and a SELECT NONE button 280 that, when selected, deselects all previously selected search options 260. Upon selection, the selected search options 260 may be highlighted, bolded, shaded or grayed-out, include a bolded outline, or include a marker to indicate selection. In some cases, as illustrated in the example shown in FIG. 10, the search options 260 may each include a check box 284 that may include a check mark or X to indicate selection. Upon selection of the DONE button 288, the controller 18 may recall and display the user interactions that have been classified in one of the selected search option or options. The user interactions that are not related to the selected option(s) may be filtered out and may not appear on the display. Different search options may be selected to recall a different set of search results. In some cases, the search screen 256 may include a BACK button or CANCEL button 292 that, when selected, may cause the user interaction log screen 204 of FIG. 9 to be displayed.

Figure 11:
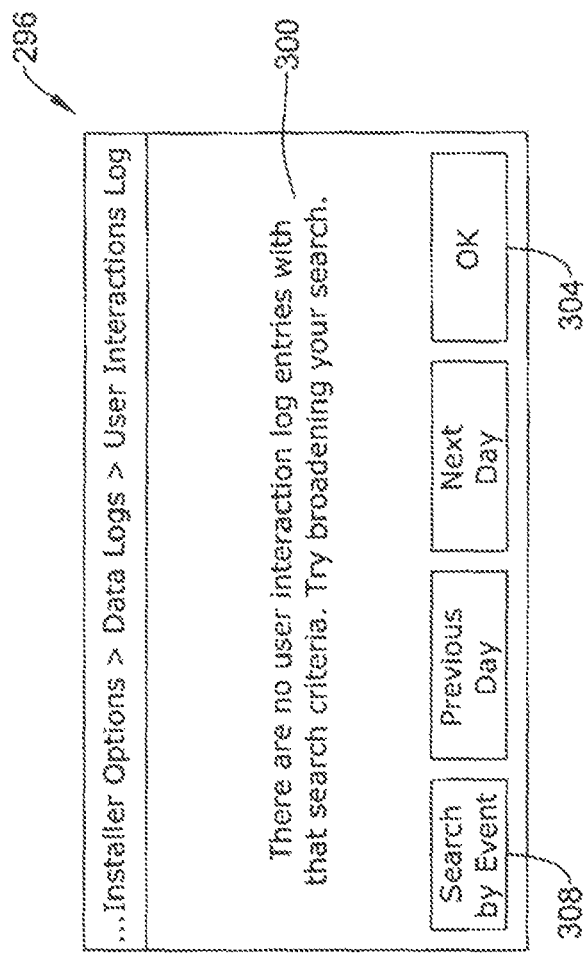

In some cases, when the selected search options do not correspond to the type of user interactions logged and classified by the controller, the controller 18 may display a user message screen 296, including a user message 300 as shown in the illustrative example of FIG. 11. In some cases, the user message 300 may contain a brief message describing the problem and/or a helpful tip for circumventing the problem. For example, in the illustrative example shown in FIG. 11, the user message 300 may state "[t]here are no user interaction log entries with that search criteria. Try broadening your search." The user message screen 296 may include an OK button 304 that, when selected, signifies acknowledgement of the user message, which may cause the controller 18 to display the data logs menu screen 184 or other previous menu screen. In some cases, the user message screen 296 may include a SEARCH button or SEARCH BY EVENT button 308, similar to that described above with reference to FIG. 10 that, when selected, may cause the controller 18 to display the search screen 256 of FIG. 10. From the search screen 256, the user may then select different search options for which to search the user interactions log.

In some cases, a user's response to an alert that is displayed by the controller 18 may be recorded and logged in the user interaction log 208. For example, as shown in FIG. 9, the user interaction log 208 may include a text string which may describe the user's interaction as a "Change Air Filter Alert—Ignore", indicating that an alert was displayed on the display, indicating the need to change the air filter of the HVAC system 4, and that the user responded by selecting an ignore alert option. Additional entries specific to this type of user event may be accessed and viewed by using the SEARCH BY EVENT button 252, as described above. For example, if a contractor desired to view only those entries relating to faults and alerts, including a user's response to the faults and alerts, the contractor may choose to select only the search option 260 labeled Faults/Alerts, as shown in FIG. 10. Upon pressing the DONE button 288, the controller 18 then may display only those log entries related to a fault and/or an alert that was viewable by a user.

For most cases, the primary difference between a fault and an alert is that a fault is typically not displayed to a user until a predetermined number of faults for a particular category of faults have been recorded and logged within a predetermined time period. Additionally, a fault may not require a user to take a particular action. An alert, however, is typically displayed to the user and may require the user to take some sort of action. For example, an alert may indicate that an air filter change is needed. Another alert may indicate that the system is not operating properly and may prompt the user to call a contractor. Still other alerts may indicate that batteries need to be changed or that a sensor has failed. In some cases, the user may have the option of snoozing or ignoring an alert. Regardless of whether the user is alerted to these faults, the controller 18 is configured to record and log the faults and alerts within a faults and alerts log contained within the memory 52.

The number of faults recorded and logged may be indicative of system performance and maybe useful to a contractor in troubleshooting the system. A faults and alerts log containing each of the faults and/or alerts recorded by the controller 44 and stored in the controller memory 52 can be accessed and viewed by selecting the "Alerts and Faults Log" data log option 188a on the data logs menu screen 184 of FIG. 8. Selecting the "Alerts and Faults Log" data log option 188a may cause a faults and alerts log 316 to be displayed as shown in the illustrative example provided in FIG. 12.

In some cases, the faults and alerts log 316 may be displayed in a table 320 In some cases, the table 320 may be a scrolling table, in which case the faults and alerts screen 312 may include a scroll bar 324 and first and second arrows 328a, 328b for navigating the faults and alerts log 316. In some cases, each individual log entry 332 may include a brief description of the alert or fault, and a date or time when the alert or fault occurred. In some cases, additional information about the individual faults and/or alerts recorded and displayed in the faults and alerts log 316 may be accessed and viewed by selecting the an individual log entry 332 displayed in the faults and alerts log 316. A DONE button 336 may be provided to confirm selection of an individual log entry 332. The faults and/or alerts screen 312 may include a HELP button 340 that, when selected, may cause the controller 18 to display useful information about the currently displayed screen to the user.

Figure 12:
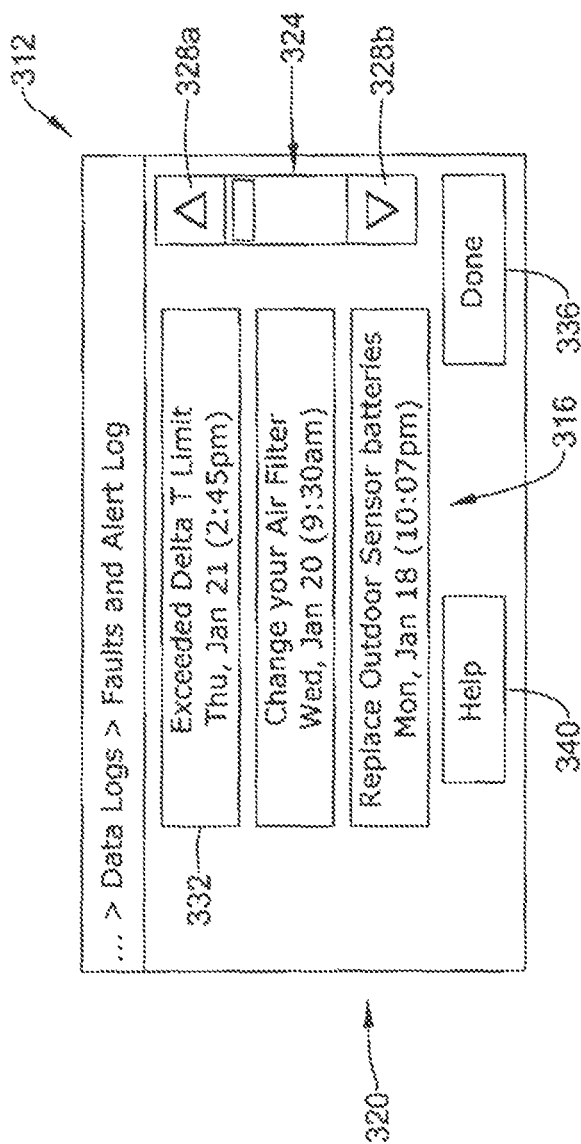
Figure 13:
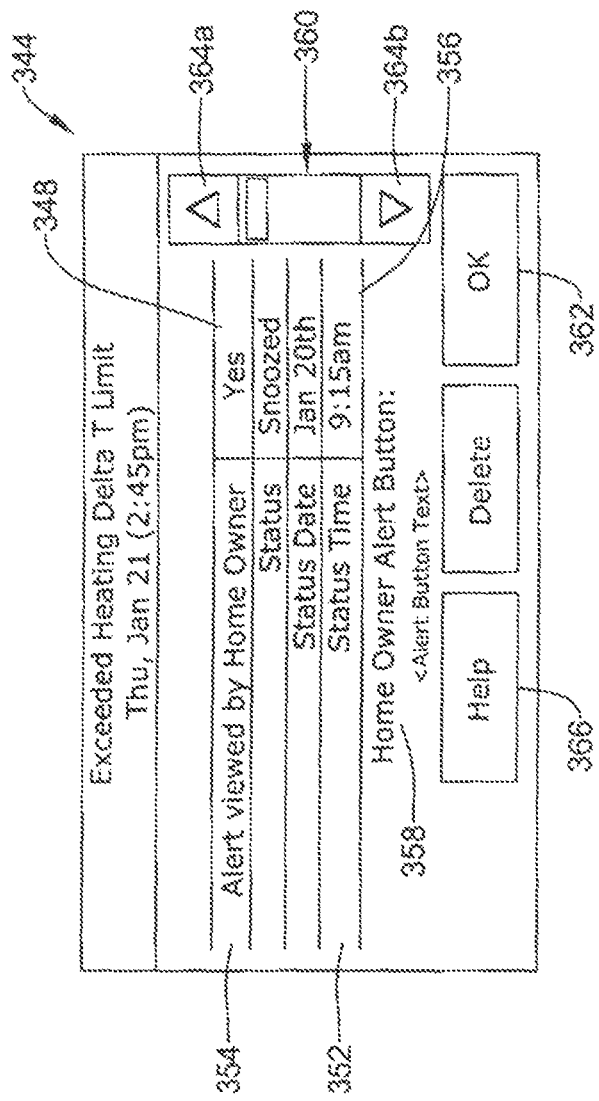
Figure 14:
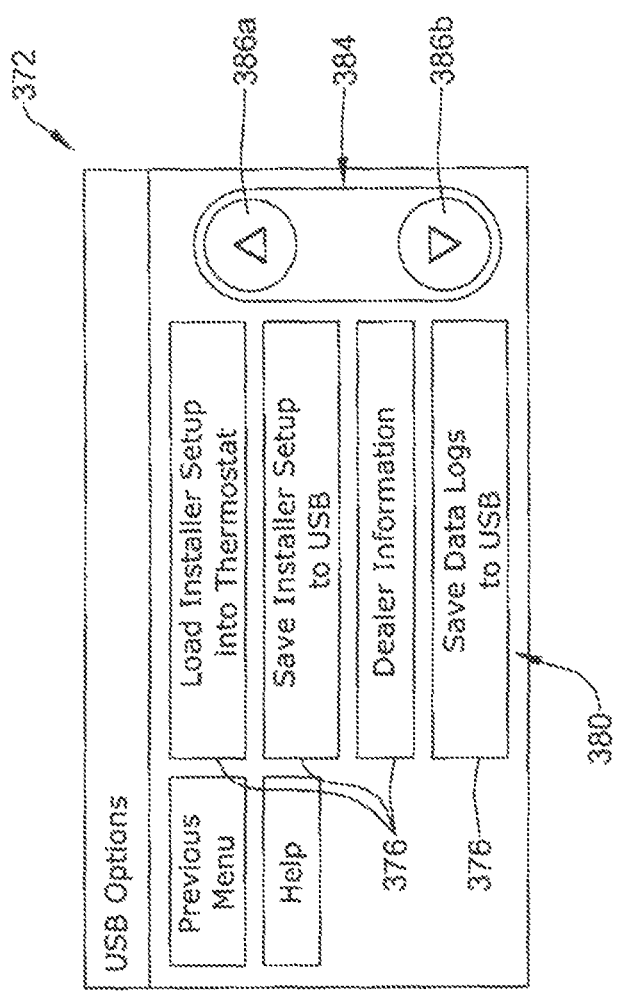

In some cases, and upon selection of an individual log entry in FIG. 12, the controller 18 may display a log entry screen 344 containing more detailed information about the fault/alert, such as shown in FIG. 13. FIG. 13 shows additional information regarding the log entry 332 of FIG. 12, which corresponds to an "Exceeded Delta T Limit" fault/alert. In some cases, upon viewing the individual log entry 332 related to the selected fault or alert, a contractor may determine what action, if any, was taken by the user in response to a particular alert. The contractor may be able to use this information to determine if a user's action(s) or inaction(s) contributed to a possible problem or failure of the HVAC system. The additional information may be displayed in a table 348. In some cases, the table 348 may be a scrolling table, in which case the log entry screen 344 may include a scroll bar 360 and first and second arrows 364a, 364b for navigating the table 348. In the example shown, additional information about the fault or alert may be accessed and viewed by using arrows 364a, 364b to scroll up and down within the table 348.

In the embodiment shown, the table 348 may include a first column 352 and a second column 356. The first column 352 may contain a number of informational categories pertaining to the fault or alert. The second column 356 may contain data associated with each of the adjacent informational categories 354 listed in the first column 352. For example, an information category displayed in the first column 352 may be "Alert Viewed by Home Owner". The data provided in the adjacent second column 356 may indicate "yes" or "no". In the illustrative example provided in FIG. 13, the data provided in the second column 356 indicates "yes." Additional information categories that may be included in the table 348 may include information categories related to the fault or alert status, the status date and/or time, categories related to the system set up and current operational mode, categories relating to the current environmental parameters (e.g., temperature, humidity, etc.), categories relating to pre-determined limits for a particular parameter, and the like. In the example shown, the table 348 includes the status of the alert relating to the "Exceeded Delta T Limit", the status date, and the status time. The status of the alert is indicated in the second column as "Snoozed", indicating that the user selected a snooze option in response to the alert. Other indicators used to indicate a status of an alert may include "ignored", "dismissed" or "active". The status date and/or time indicates when the user responded (or in some cases, did not respond) to an alert. In still other cases, the status indicator may indicate what action was taken by a user in response to an alert. For example, the status may indicate that the user has indicated that he has changed the batteries, changed the filter, or adjusted a temperature set point. It will be generally recognized that the status of a fault or alert, and the data associated with the fault/alert status, is dependent upon the type of fault or alert. In some cases, the log entry screen 344 may also include a user message or owner alert, including a brief message describing the nature of the fault or alert that was displayed to the user.

In some cases, the log entry screen 344 may include an OK button 362 that, when selected, causes the controller 18 to display the faults and alerts log screen 312 of FIG. 12. A HELP button 366 that, when selected, may cause the controller 18 to display useful information about the currently displayed screen to the user. In the illustrative embodiment, and upon returning to the faults and alerts log screen 312, a user may select a different log entry 332 for viewing.

In some cases, the controller 18 may be programmed to replay the sequence of events that occurred over a previous period of time. For example, it is contemplated that a contractor or other user may initiate a reply mode, in which the controller 18 may sequentially display the screens that were presented to the user, along with the user's responses, in a slide show fashion. For a given display screen, it is contemplated that buttons, arrows and/or other data input items that were selected by the user may be indicated by highlighting the data input items in the same sequence that they were selected by the user. A date and/or time may be displayed on each display screen to indicate when the user interaction took place. This may provide an intuitive way of displaying the previous user interactions and/or the faults and alerts.

In some cases, the data logs (e.g., user interactions log, fault/alert log, etc.) may be downloadable from the memory 52 such that they can be viewed on an external device such as a personal computer, laptop, iPAD®, PDA, smart phone, and the like. In some cases, a user or contractor may connect a USB device or other remote device to a data port 56 to download the data logs. Depending upon the type of remote device, the connection may be wired or wireless connection. It should be noted that other useful information may also be downloaded to the external device. Upon recognition that an external device has been connected to data port 56, the controller 18 may display an external device options screen, such as device option screen 372 of FIG. 14, which may include a number of selectable options 376 relating to the external device. The selectable options 376 may be provided in a table 380. In some cases, the table 380 may be a scrolling table, which may include a scroll bar 384 and first and second arrows 386a, 386b for navigating the available selectable options 376 provided in the table 380.

Figure 15:
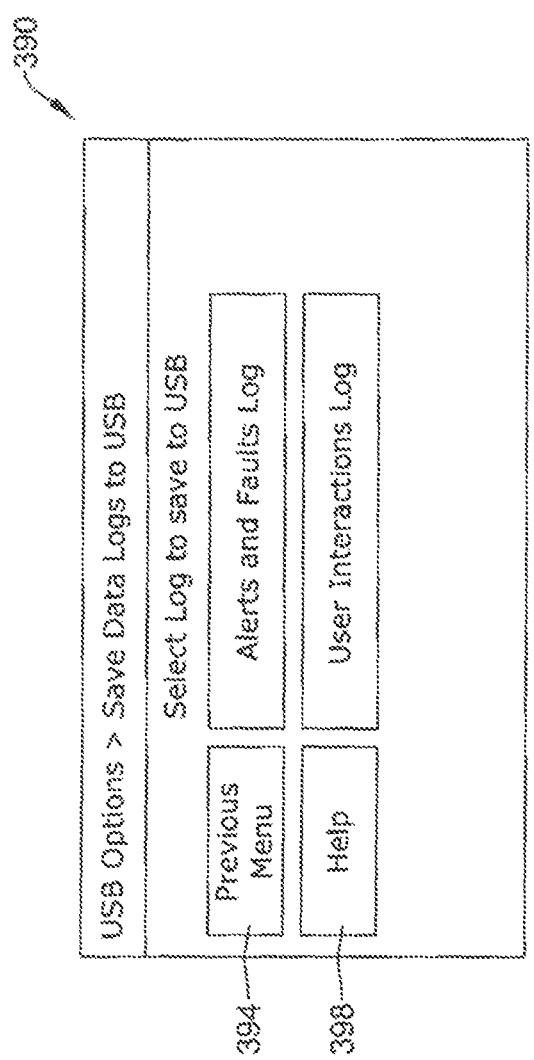

In some cases, selecting the "Save Data Logs" menu option 376 may cause the controller to display a data log selection screen 390 as illustrated in FIG. 15. The data log selection screen 390 may display the data logs that may be selected by the user for download. In the illustrative example of FIG. 15, the data logs that are available for download include the Alerts and Faults Log and the User Interactions Log. In some cases, the data log selection screen 390 may include a PREVIOUS MENU button 394 that, when selected, may cause the controller 18 to display the external device options screen 372 of FIG. 14. The data log selection screen 390 may include a HELP button 398 that, when selected, may cause the controller 18 to display useful information about the currently displayed screen.

Figure 16:
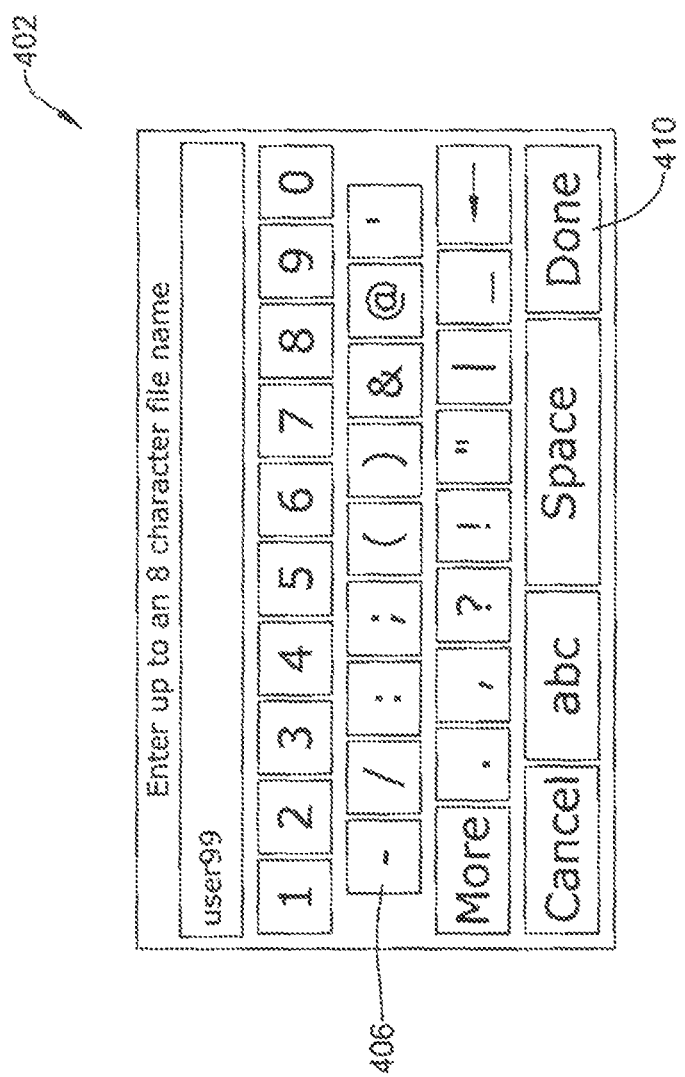
Figure 17:
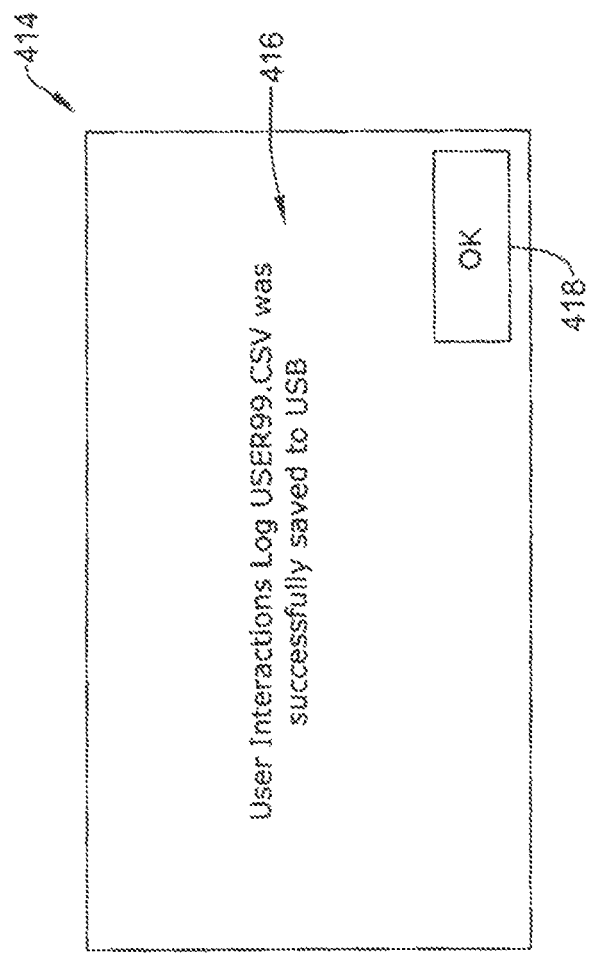

Selection of the desired log through the data log selection screen 390 may, in some cases, cause the controller 18 to display a file naming screen 402, such as shown in FIG. 16. The file naming screen 402, when provided, may allow a user to name a data file to which the selected data log may be saved on the external device. In some cases, the file naming screen 402 may include an alphanumeric key pad 406, which may facilitate entry of the data file name. Selection of the DONE button 410 may cause the controller 18 to display a confirmation screen 414, such as shown in FIG. 17.

In some cases, the confirmation screen 414 may include a user message 416 indicating that the data log was successfully saved to the external device. The user message 416 may also indicate the file name for the saved data log. In some cases, the data logs and other information downloaded from the controller 18 may be saved in any number of file formats including .CSV and .TXT. Once saved to the external device, the files may be converted to another file format such as MS EXCEL or WORD for further analysis, if desired. The confirmation screen 414 also may include an OK button 418 and/or a BACK button that, when selected, may cause the controller to display the data log selection screen 390 of FIG. 15. From the data log selection screen 390, the user then select another available data log for download and repeat the saving procedure as described in reference to FIGS. 16 and 17, if desired. Once the data logs and any additional data have been saved to the external device, the external device may be disconnected from the controller 18.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. An HVAC controller configured to control one or more HVAC components of an HVAC system, the HVAC controller comprising:
a user interface including a display, the user interface configured to accept one or more user interactions of a user of the HVAC controller during operation of the HVAC controller;
a memory;
a controller coupled to the memory and the user interface, the controller programmed to log at least some of the user interactions that are accepted by the user interface into a user interaction log stored in the memory, wherein at least one of the user interactions corresponds to a user's response to an alert that is displayed by the HVAC controller on the display of the user interface; and
the controller further programmed to recall at least some of the user interactions from the user interaction log, and to display the recalled user interactions on the display of the user interface upon request.

2. The HVAC controller of claim 1, wherein the user interaction log includes a description of at least some of the user interactions that are logged in the user interaction log.

3. The HVAC controller of claim 1, wherein the user interaction log includes a time and/or date of at least some of the user interactions that are logged in the user interaction log.

4. The HVAC controller of claim 1, wherein the alert is a maintenance alert, and the maintenance alert allows a user to select between two or more options in response to the maintenance alert.

5. The HVAC controller of claim 4, wherein the selection of one of the two or more options corresponds to the user's response to the maintenance alert.

6. The HVAC controller of claim 4, wherein the maintenance alert is one or more of a filter change reminder alert, a replace battery reminder alert, and an HVAC performance alert.

7. The HVAC controller of claim 1, wherein one or more of the user's interaction that are logged into the user interaction log include a temperature set point change.

8. The HVAC controller of claim 1, wherein one or more of the user's interaction that are logged into the user interaction log include a programmable schedule change.

9. The HVAC controller of claim 1, wherein one or more of the user's interaction that are logged into the user interaction log include an installer setting change.

10. The HVAC controller of claim 1, wherein one or more of the user's interaction that are logged into the user interaction log include one or more of a user initiated temperature setting change, a user initiated system/fan mode change, a fault/alert viewable by a user, a user initiated installer setting change, a user initiated programmable schedule change, a user initiated date/time change, a user initiated indoor air quality setting change, a user initiated change that may affect indoor quality, a user preference change, a maintenance change carried out by a user.

11. The HVAC controller of claim 1, wherein the HVAC controller is a thermostat that includes a temperature sensor for sensing an ambient temperature at or near the thermostat.

12. The HVAC controller of claim 1, further comprising a data port, wherein the data port facilitates downloading at least part of the user interaction log to a remote device.

13. An HVAC controller configured to control one or more HVAC components of an HVAC system, the HVAC controller comprising:
a user interface including a display, the user interface configured to accept one or more user interactions of a user of the HVAC controller during operation of the HVAC controller;
a memory;
a controller coupled to the memory and the user interface, the controller programmed to log at least some of the user interactions that are accepted by the user interface into a user interaction log stored in the memory, wherein the controller is programmed to indicate in the user interaction log that one or more of the user interactions were initiated from a remote location; and the controller further programmed to recall at least some of the user interactions from the user interaction log, and to display the recalled user interactions on the display of the user interface upon request.

14. An HVAC controller configured to control one or more HVAC components of an HVAC system, the HVAC controller comprising:

a user interface including a display, the user interface configured to accept one or more user interactions of a user of the HVAC controller during operation of the HVAC controller;

a memory;

a controller coupled to the memory and the user interface, the controller programmed to log at least some of the user interactions that are accepted by the user interface into a user interaction log stored in the memory, wherein the controller is programmed to classify at least some of the user's interactions into two or more classes; and the controller further programmed to recall at least some of the user interactions from the user interaction log, and to display the recalled user interactions on the display of the user interface upon request.

15. The HVAC controller of claim 14, wherein the controller is programmed to allow a user to select a selected class.

16. The HVAC controller of claim 15, wherein the controller is programmed to recall at least some of the user interactions of the selected class, and to display the recalled user interactions of the selected class on the display of the user interface upon request, while not displaying at least some of the user interactions that are not classified in the selected class.

17. A method of monitoring an HVAC system including one or more HVAC components that are controlled, at least in part, by an HVAC controller having a user interface including a display, a memory, and a controller, the method comprising;

accepting one or more user interactions of a user of the HVAC controller;

recording at least some of the user interactions that are accepted by the user interface into a user interaction log stored in the memory of the HVAC controller, wherein at least one of the user interactions corresponds to a user's response to an alert that is displayed by the HVAC controller on the display of the user interface;

recalling at least some of the user interactions from the user interaction log; and displaying the recalled user interactions on the display of the user interface.

18. The method of claim 17, further comprising storing a description of at least some of the user interactions in the user interaction log.

19. The method of claim 17, further comprising storing a time and/or date of at least some of the user interactions in the user interaction log.

20. The method of claim 17, wherein at least one of the user interactions corresponds to making a setting change to the HVAC controller.

21. An HVAC controller configured to control one or more HVAC components of an HVAC system, the HVAC controller comprising:

a user interface including a display;

a memory;

a controller coupled to the memory and the user interface, the controller programmed to display one or more alerts on the display of the user interface, and to allow a user to select between two or more responses in response to the one or more alerts;

the controller further configured to log at least some of the alerts and the corresponding user responses into a user interaction log stored in the memory; and the controller further programmed to recall at least some of the alerts and the corresponding user responses from the user interaction log, and to display the recalled alerts and the corresponding user responses on the display of the user interface upon request.

* * * * *